Feb. 6, 1940.　　B. EVANS ET AL　　2,189,105
BOX FORMING MACHINE
Filed Sept. 2, 1938　　9 Sheets-Sheet 1
Fig. 1.
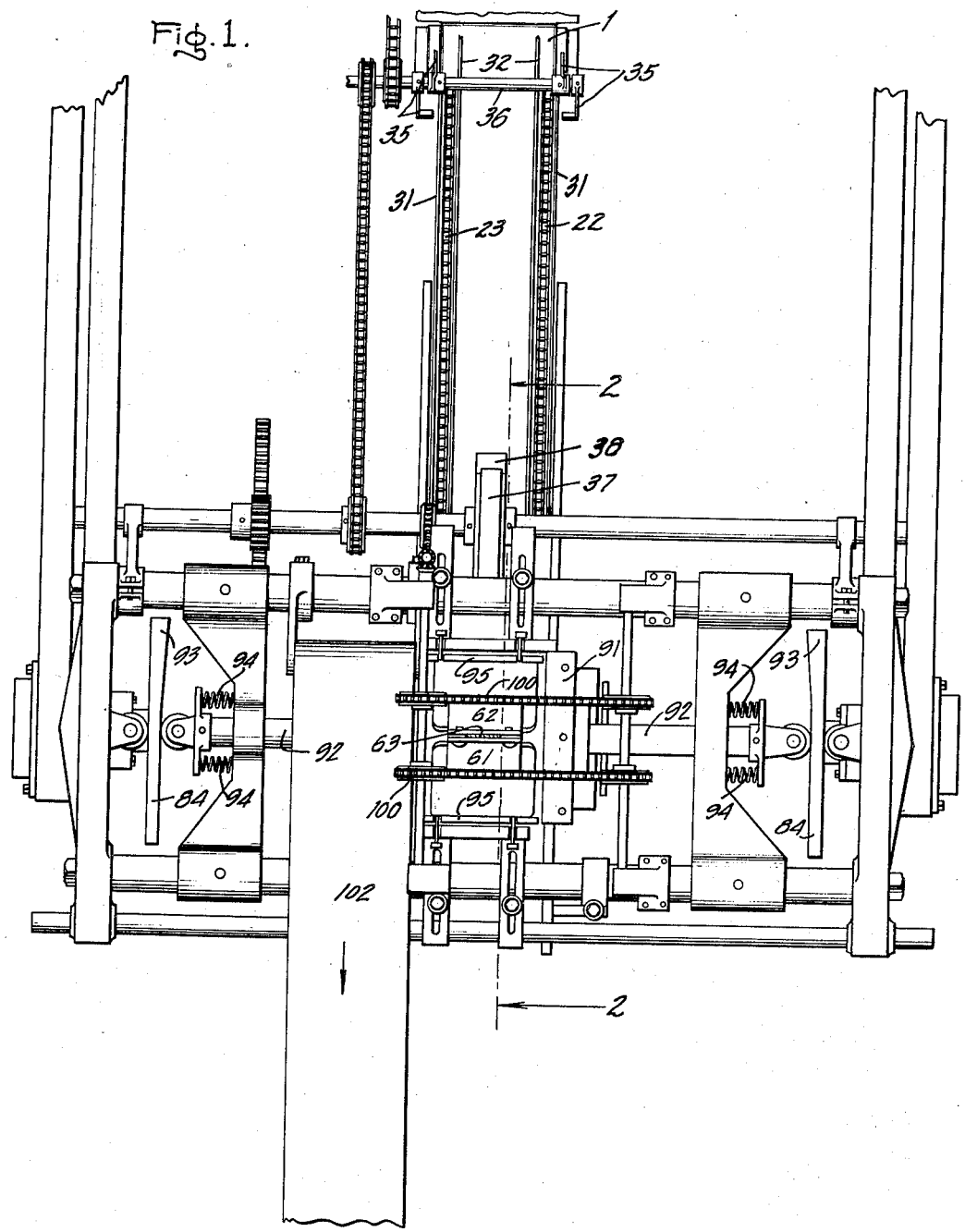
Inventors:
Benjamin Evans
Henry L. Metzger
by 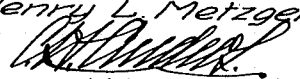
Attorney.

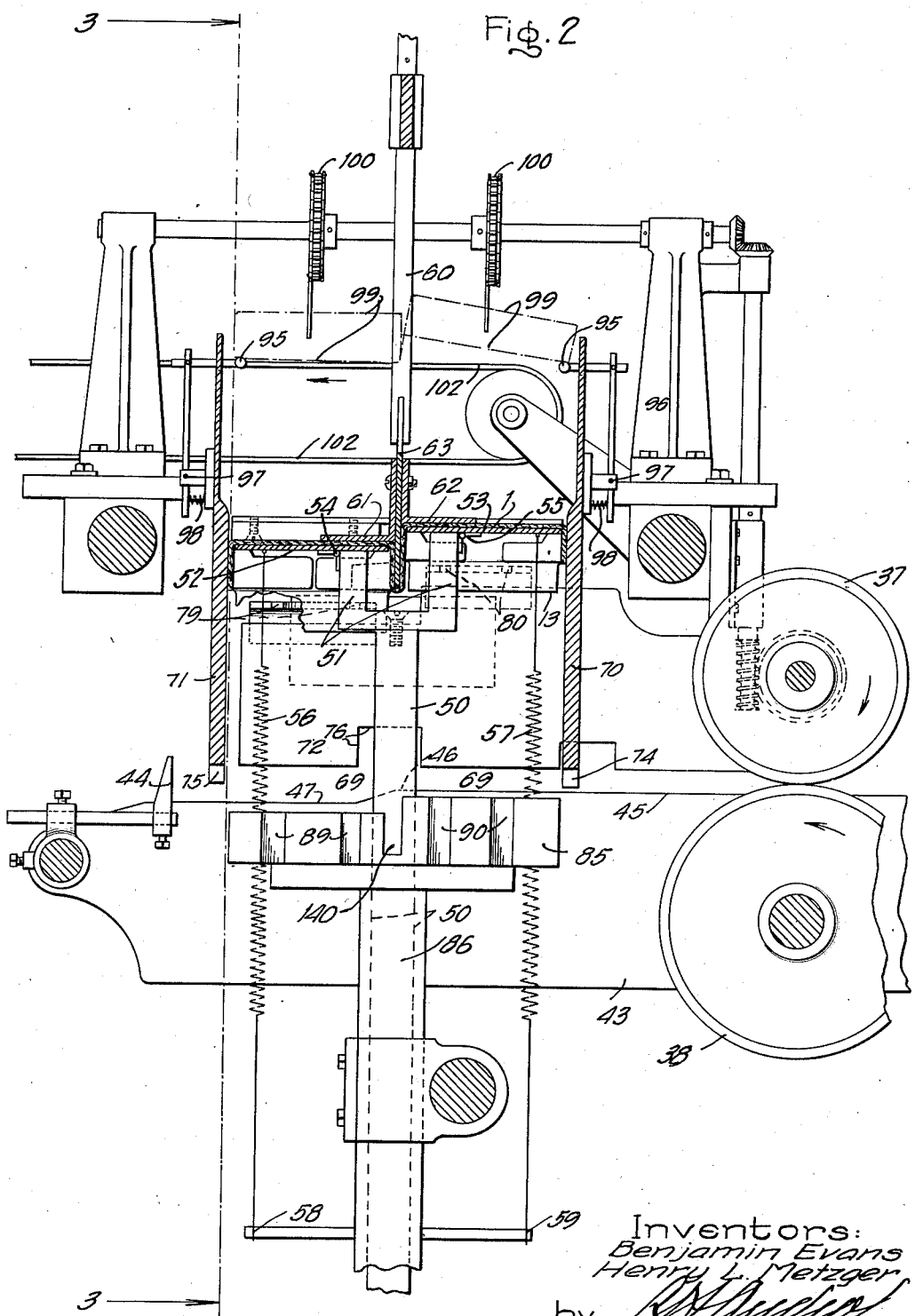

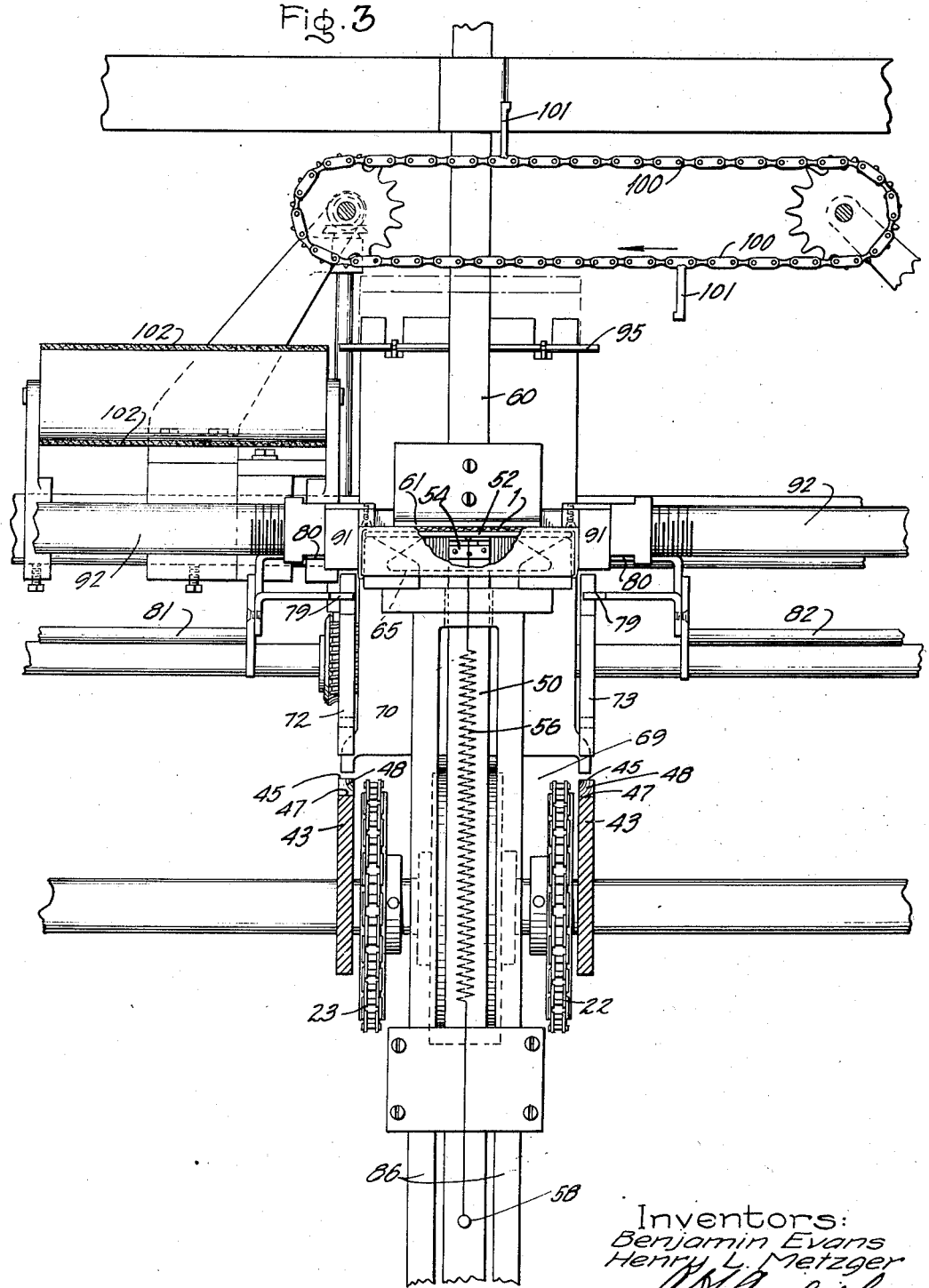

Feb. 6, 1940.  B. EVANS ET AL  2,189,105
BOX FORMING MACHINE
Filed Sept. 2, 1938  9 Sheets-Sheet 4
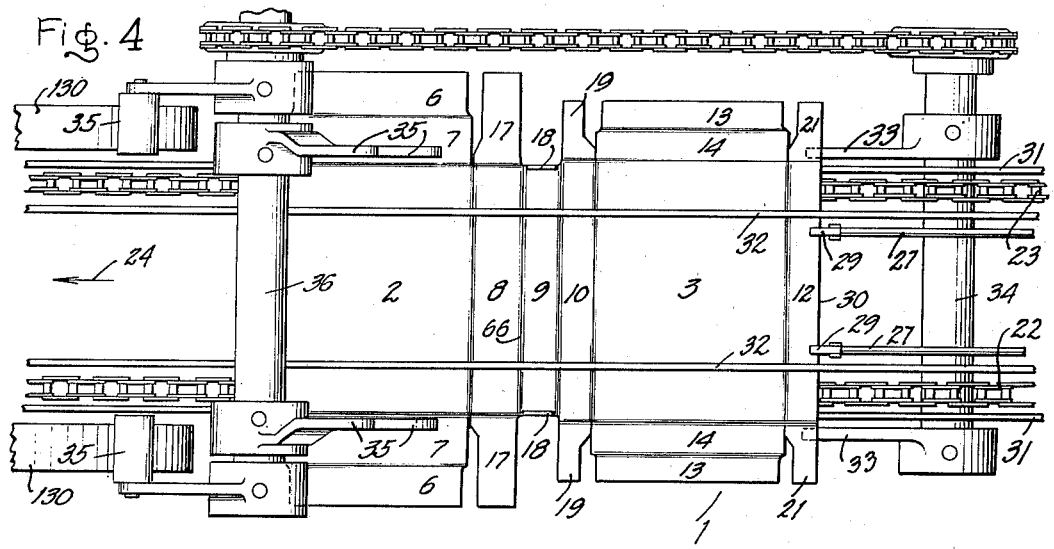
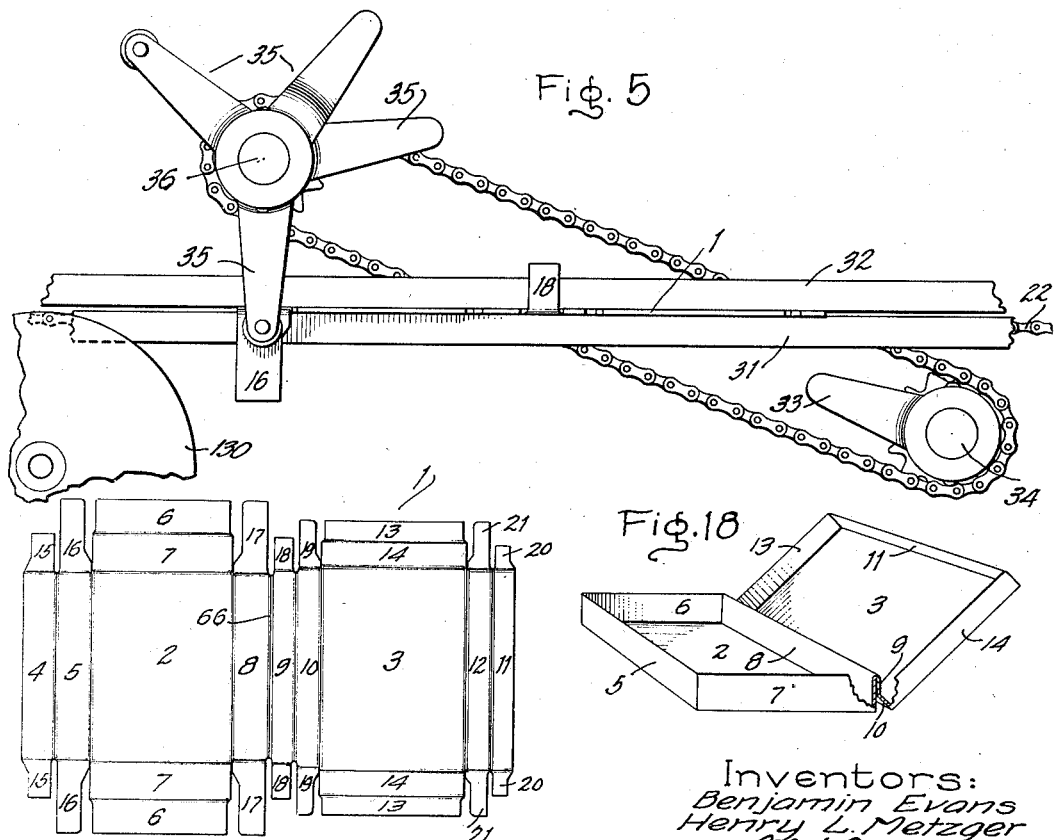
Inventors:
Benjamin Evans
Henry L. Metzger
by
Attorney.

Feb. 6, 1940. B. EVANS ET AL 2,189,105
BOX FORMING MACHINE
Filed Sept. 2, 1938 9 Sheets-Sheet 5
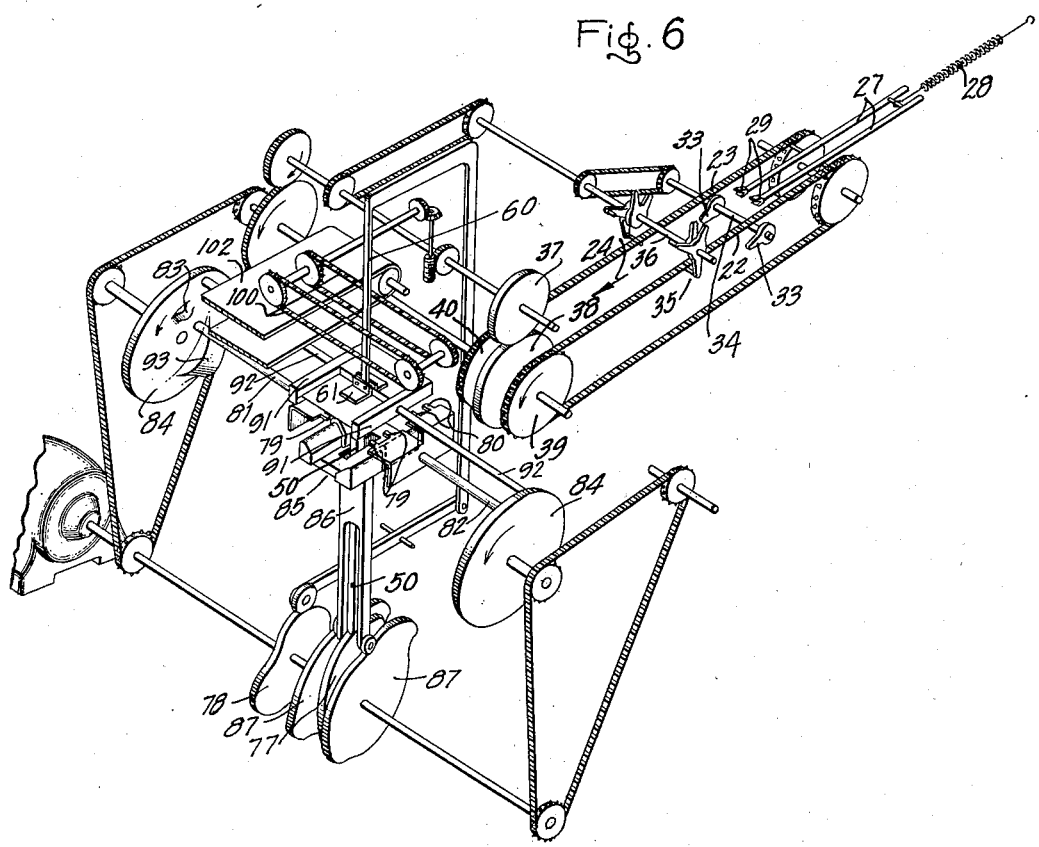
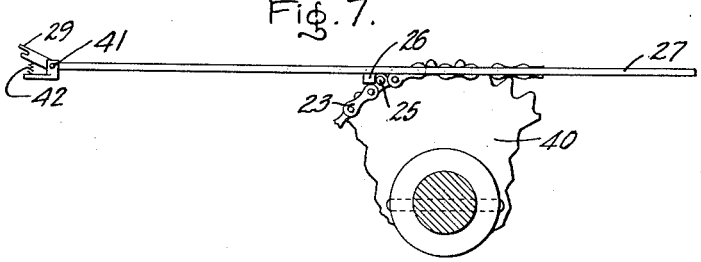
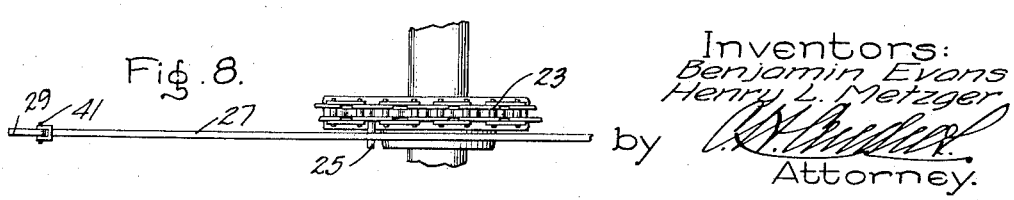
Inventors:
Benjamin Evans
Henry L. Metzger
by
Attorney.

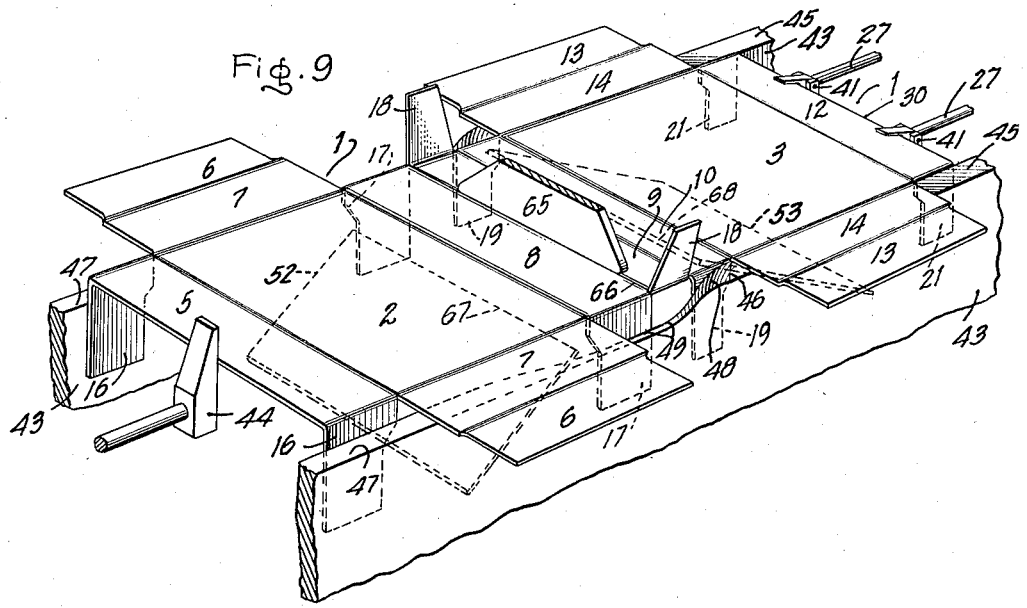

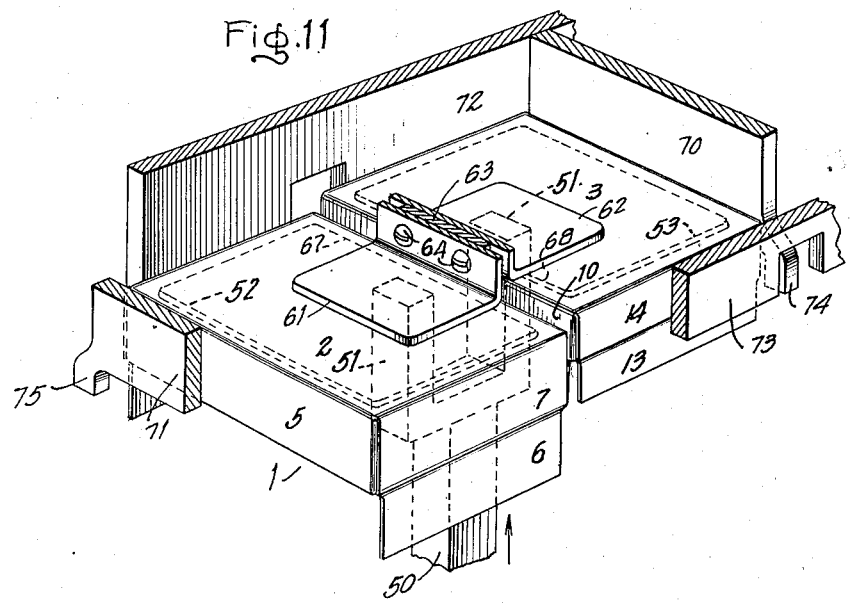
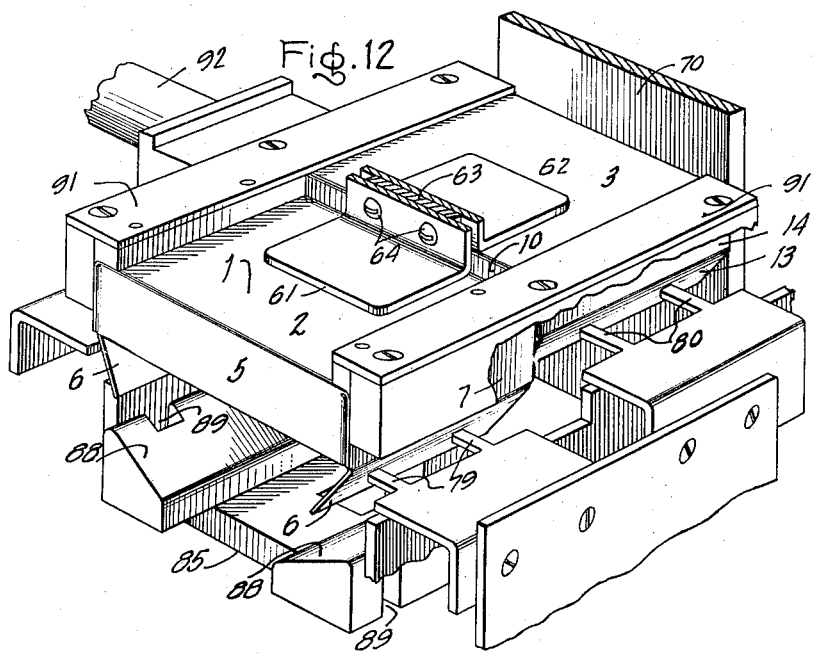

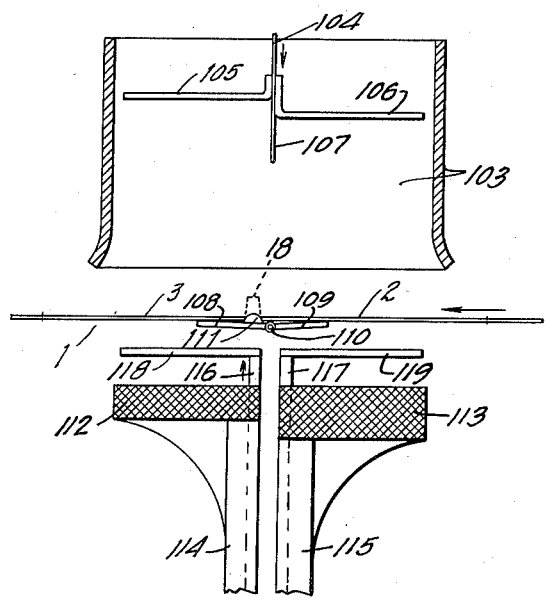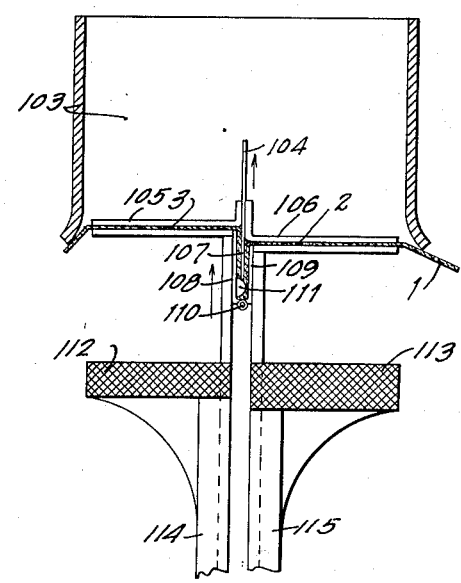

Feb. 6, 1940.   B. EVANS ET AL   2,189,105
BOX FORMING MACHINE
Filed Sept. 2, 1938   9 Sheets—Sheet 9
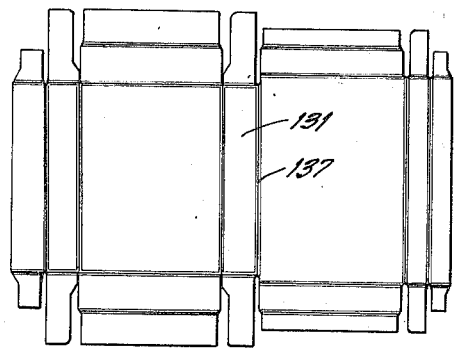
Fig. 19
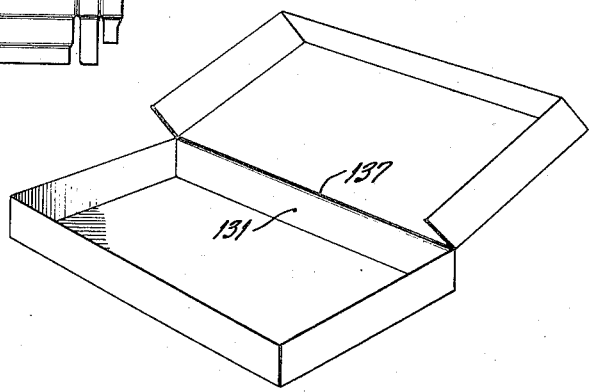
Fig. 20
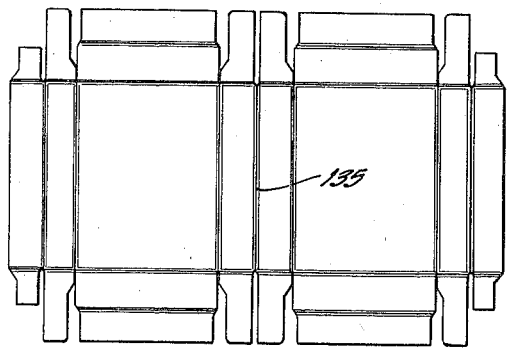
Fig. 21
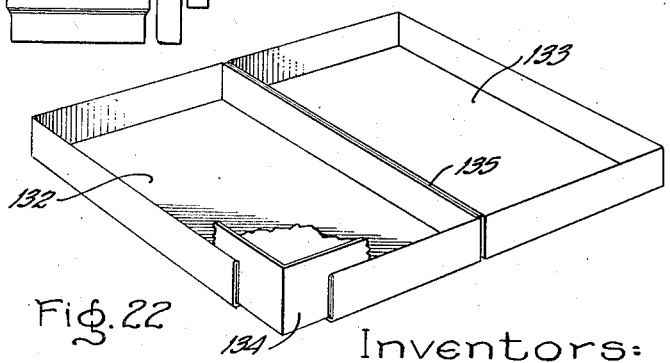
Fig. 22
Inventors:
Benjamin Evans
Henry L. Metzger
by 
Attorney.

Patented Feb. 6, 1940

2,189,105

UNITED STATES PATENT OFFICE 2,189,105

BOX FORMING MACHINE

Benjamin Evans, Albany, and Henry L. Metzger, Castleton on Hudson, N. Y., assignors to Fort Orange Paper Company, Castleton on Hudson, N. Y., a corporation of New York Application September 2, 1938, Serial No. 228,078

31 Claims. (Cl. 93—51)

Our invention relates to box or tray forming machines and particularly, but not exclusively, to a machine for forming a box of the type having integral cover and receptacle portions such, for example, as is disclosed in Letters Patent No. 2,094,448 granted on September 28, 1937, to Benjamin Evans, one of the co-inventors herein.

Boxes of the type disclosed in the Letters Patent aforesaid are of the so-called telescopic type and are distinguished over boxes of this general type theretofore known by the fact that the cover is provided with a hinge integral with the main body of the box, and the parts are so correlated that the cover is provided with four sides which entirely surround the upper end or top of the box proper when closed.

The principal object of our invention is to provide a method and machine for continuously and completely forming telescope boxes from a series of blanks which are fed to the box-forming mechanism. Another object is to provide a machine capable of simultaneously forming, from a single blank, two integral trays which thereafter may be separated by cutting or tearing.

We accomplish these and other objects, which will be apparent as the description proceeds, by means of the novel elements and the combinations and arrangements thereof described below and illustrated in the accompanying drawings in which—

Fig. 1 is a fragmentary plan view of our machine;

Fig. 2 is a section in the plane 2—2 of Fig. 1;

Fig. 3 is a section of Fig. 2 in the plane 3—3;

Fig. 4 is a fragmentary plan view showing in part the blank conveying mechanism, a blank thereon, and means for deflecting some of the tabs on the blank;

Fig. 5 is a side elevation view of parts shown in Fig. 4;

Fig. 6 is a diagrammatic perspective view, with certain parts removed for the purpose of clearness, showing, in a purely schematic way the driving mechanism for the various parts of the machine together with so much of the parts actuated thereby as is necessary for a clear understanding of the operation of the device;

Fig. 7 is a fragmentary side elevation view of a portion of the blank conveyor;

Fig. 8 is a fragmentary plan view of parts shown in Fig. 7;

Figs. 9, 10, 11 and 12 are perspective views showing successive conditions of a blank undergoing formation in the forming head of the machine and so much of the elements of said forming head as cooperate directly with the blank in the forming process;

Figs. 13, 14, 15 and 16 are fragmentary elevation views, partially in section, showing a modified type of forming head and the sequence of operation of the parts there shown in forming a blank;

Fig. 17 is a plan view of a box blank;

Fig. 18 is a perspective view of a completed box;

Fig. 19 is a modified form of blank which our machine is capable of forming into a box;

Fig. 20 is a perspective view of a box formed from the blank shown in Fig. 19;

Fig. 21 is a plan view of a further modified form of blank which may be formed in our machine into a box or into two connected trays which may afterwards, or during the forming operation, be severed to form two separate trays; and Fig. 22 is a perspective view of two connected trays formed from the blank shown in Fig. 21 and also showing a fragmentary portion of a deeper tray inserted in one of the trays to form a box.

Referring to the drawings, 1 represents a blank of fibrous or other sheet material having a portion 2 adapted to form the bottom of the receptacle portion of the box, a portion 3 adapted to form the top of the cover, a portion 5 adapted to form a front panel of the receptacle, portions 6 and 7 adapted to form the side panels of the receptacle portion of the box, portions 8 and 9 adapted to form the back of the receptacle, a portion 10 adapted to form the back panel of the cover, a portion 12 adapted to form the front panel of the cover, and portions 13 and 14 adapted to form the side panels of the cover. If the front panel of the receptacle is to be of double thickness a portion 4 with tabs 15 is provided which is prefolded over upon and adhesively secured to the portion 5 before the blank is introduced into our forming machine. Similarly, if the front panel of the cover is to be of double thickness, a portion 11 with end tabs 20 is provided which is prefolded upon and adhesively secured to portion 12.

The portion 5 is provided with end tabs 16, the portion 8 with end tabs 17, the portion 9 with end tabs 18, the portion 10 with end tabs 19, and the portion 12 with end tabs 21.

Means for feeding blanks from a magazine or stack to box-forming machines are well known in the art and for this reason we have neither illustrated nor described any such means in connection with our machine. However, we have shown a means for conveying the blanks received from the magazine or stack to the box-forming portion of the machine because in connection with such conveying mechanism, which may be of any suitable type, it is desirable and convenient to deflect certain of the tabs on the blank, as will hereinafter be described, during the travel of the blank on the conveyor.

Referring more particularly to Figs. 1, 4, 5, 6, 7 and 8, 22 and 23 represent conveyor chains moving in the direction of the arrow 24 to which may be attached pins or lugs 25 adapted to engage lugs 26 associated with a pair of horizontally movable rods 27 which are normally retracted in a direction opposite to the direction of the chain movement by a helical spring 28. These rods are provided at the forward end with spaced jaws 29 adapted to engage the rear edge 30 of the blank as shown in Fig. 4. The blanks are moved toward the forming head of the machine by means of the rods 27 and are carried between bottom rails 31 and top rails 32. Synchronized with the conveying mechanism are tab deflectors 33 rotatably mounted on a shaft 34 positioned below the path of blank travel, and also tab deflectors represented generally by the numeral 35 rotatably mounted on a shaft 36 positioned above the path of blank travel and in spaced relation to shaft 34. These tab deflectors are so positioned relatively to each other and with respect to the blank during its travel and so synchronized with the blank movement that the deflectors 33 are adapted to contact the tabs 18 and deflect them upwardly to the position shown in Figs. 4, 5 and 9. The tab deflectors 35 are similarly arranged and synchronized to turn all the other tabs, that is to say, tabs 16, 17, 19 and 21 downwardly to the positions shown in Fig. 9. During the travel of the blank, as aforesaid, glue is applied to the lower surface of the portions 6, 7, 13 and 14 by means of the glue rolls 130. The blanks, after the application of glue thereto and after the tabs have been deflected, move forwardly on the conveyor until they are engaged in the pinch of rolls 37 and 38. The peripheral speed of rolls 37 and 38 is substantially higher than the rate of travel of the push rods 27 so that when the blank is engaged in the pinch of the rolls it is quickly pulled from the jaws 29 on the end of the push rods and slid along the rails 43 (see Figs. 2, 3, 9 and 10), until its progress is stopped in the proper position relative to the forming head by means of the adjustable stop 44. As the conveying chains 22 and 23 begin to move downwardly over the sprockets 39 and 40 respectively, the pins 25 move out of engagement with the lugs 26 on the rods 27 and the rods are retracted to their original starting position to engage the following blank by means of the spring 28. Since these rods in moving backwardly must pass beneath the next blank, the blank-engaging jaws 29 are pivotally mounted as shown at 41 (see Figs. 7 and 8) and are yieldingly held in the position shown in Figs. 7 and 8 by light helical springs 42.

Referring now more particularly to Figs. 2, 3 and 9 in connection with Fig. 6, the rolls 37 and 38 progress the blanks toward and into the forming head of the machine which is illustrated generally in Figs. 1, 2 and 3. By reference particularly to Figs. 2 and 9 it will be noted that the tops of the rails 43 do not lie in the same horizontal plane throughout their entire extent. From the portions adjacent the rolls 37 and 38 the rails extend at the same level, indicated at 45, up to the point 46 which, in the embodiment illustrated, is just short of the center of the forming head and adjacent the tab 18. Here the top surfaces of the rails drop to a lower level 47 and these levels are connected by means of a warped transition surface 48, best illustrated in Figs. 9 and 10. It will also be noted that the rails 43 adjacent the transition surfaces 48 and in those zones where the top surfaces drop to the level 47 are somewhat thinned out at the top, as shown at 49 in Figs. 9 and 10, and the top surfaces of the rails in these thinner zones are beveled or slopped downwardly and inwardly toward each other. The function of the change in elevation of the top surfaces of the rails, the transition surfaces 48 and the thinned portions of the rails will be apparent as the description proceeds.

Mounted to reciprocate vertically within the forming head is a plunger 50 (see Figs. 2, 3, 6 and 11) having a bifurcated upper end portion 51 (see Fig. 2) and to which press plate elements 52 and 53, forming together the lower press plate are pivotally connected by means of hinges 54 and 55, respectively. The elements 52 and 53 are normally held in what may be termed open position, as shown in Fig. 9, by means of tension springs 56 and 57 (see Figs. 2 and 3) which are secured to the ends of the plates which are remote from each other, and which tend to swing these ends downwardly about the pivots in the hinges 54 and 55. Since these springs move with the plunger 50 the ends thereof are anchored in any suitable manner thereto, as shown at 58 and 59.

Mounted to reciprocate vertically above the plunger 50 is a second plunger 60 carrying at its lower end the upper press plate comprising elements 61 and 62, which, in the embodiment of our invention here illustrated, are in stepped relation because, it will be noted by reference to Fig. 17 showing a plan view of the box blank that, the depth of the receptacle portion is greater than that of the cover portion, and the difference in elevation of the steps is equal to the difference between the width of the portion 8 of the blank shown in Fig. 17 and the combined widths of the portions 9 and 10; 8 representing the depth of the receptacle and 10 the depth of the cover portion with the portion 9 about equal in width to the portion 10.

For certain boxes of the type illustrated in said United States Letters Patent it may be that the width of the portion 8 is exactly equal to the combined widths of the portions 9 and 10, and in such cases the plates 61 and 62 will lie in the same plane. For the reason that the lower press plate cooperates with the upper plate the hinged elements 52 and 53 forming the lower press plate are in similar stepped relation.

However, it is to be understood that our machine may be used to form boxes of a somewhat modified type such, for example, as shown in Fig. 20, in which there is no back panel in the cover, and in which case the difference in elevation of the steps in the press plates is made equal to the width of the back panel 131 of the receptacle.

Where two hinged trays of equal depth, such as shown at 132 and 133 in Fig. 22 are to be formed, the upper and lower press plates are not stepped because, as will be apparent from Fig. 22, the bottoms of the trays lie in the same plane. Two such hingedly connected trays may be said to constitute the cover and receptacle portions of a box although it is usual to insert a third and deeper tray 134 in the receptacle and over which the cover 133 telescopes.

Instead of using the connected trays shown in Fig. 22 to form a box, they may, after being formed together from an integral blank, be cut apart along the hinge 135 to form two separate trays.

The bottom of the plunger 60 comprises a vertical blade or plate 63 positioned between plates 61 and 62 and which latter are secured thereto by bolts or other suitable means 64. The plate 63 extends below the upper press plate and forms a divider 65 which is adapted to register with the score 66 between the portions 8 and 9 of the blank, as shown in Fig. 9. If a blank similar to that shown in Fig. 19 is being formed, the divider registers with score 137, and, in case of a blank similar to that shown in Fig. 21, it registers with score 135. The downward movement of the plunger 60 is synchronized with the upward movement of the plunger 50 so that, as the divider 65 descends and contacts the score 66 in the blank, the edges 67 and 68 of the hinged elements 52 and 53 are brought into contact with the bottom of the blank. As the plunger 60 continues its downward movement and the plunger 50 its upward movement, the portions 8, 9 and 10 of the blank are forced downwardly and the hinged elements 52 and 53 are rotated upwardly about their hinged connections into stepped horizontal planes in contact with the bottom of the receptacle portion and the top of the cover portion of the blank while the portions 8, 9 and 10 of the blank are forced downwardly between the edges 67 and 68 of elements 52 and 53 until the press plates 61 and 62 are in contact with the blank. In other words, the operations just described change the blank from the substantially plane formation shown in Fig. 9 to the formation shown in Fig. 10 where the central portion is substantially normal, or at right angles, to the adjacent portions forming the major part of the blank.

One of the important formation steps which takes place at this time is the folding of the tabs 18 over the tabs 17. As the divider moves downwardly, the upstanding tabs 18, shown in Fig. 9, are moved downwardly into contact with the warped transition surfaces 48 in the rails. At the same time, the portion 9 of the blank with its attached tabs 18 is rotated in a counterclockwise direction (as viewed in Figs. 9 and 10) about the score 66 in the blank so that the tabs are brought into juxtaposition, as shown in Fig. 10, by the combined action of this downward movement of the divider and the warped transition surfaces 48. It is to be understood that the foregoing steps thus far described have taken place substantially at the level of the tops of the rails 43 or in the space designated generally by the numeral 69 in Fig. 2.

Above the space 69 is the throat of the forming head comprising front and rear plates 70 and 71, respectively, and side plates 72 and 73; the central bottom portion of the side plates being cut out as shown at 76 in Fig. 2 in order to provide the clearance necessary to permit the upstanding tabs 18, as shown in Fig. 9, to be turned over into the position shown in Fig. 10.

The bottom edges of the front and rear plates of the throat 70 and 71, respectively, function to contact and downfold portions 12 and 5, respectively, of the blank, and it is to be understood that the edges of these plates are at a lower elevation than are the bottom edges of the side plates 72 and 73. The bottom edges of the side plates 72 and 73 serve to downfold the portions 6 and 7, and 13 and 14, of the blank, which form the side panels. In order to accomplish this downfolding of the panels the movements of the plungers 50 and 60 are so synchronized that, after the blank has been formed to the extent shown in Fig. 10, these plungers move upwardly together, and since the bottom edges of the front and rear plates 70 and 71 are lower than the bottom edges of the side plates 72 and 73, the portions 5 and 12 of the blank contact the bottom edges of the plates 71 and 70, respectively, as the plungers move upwardly, and are thus downfolded to the position shown in Fig. 11. In order to maintain the tabs 16 and 21 substantially at right angles to the portions 5 and 12, respectively, and as shown in Fig. 10, the bottom edges of the plates 70 and 71, respectively, are provided with depending legs or ears 74 and 75, respectively. As the plungers 50 and 60 continue their upward movement carrying with them the blank, the side panel portions of the receptacle and the cover are downfolded to the position shown in Fig. 11 by reason of their contact with the bottom edges of the side plates 72 and 73. It will be recalled that the inside surfaces of the side panels 6 and 7 and 13 and 14 have had an adhesive applied thereto so that, as they are downfolded over all of the overlying tabs there is adhesive between the panels and the tabs.

Referring more particularly to Figs. 1, 2, 3, 6, 11 and 12, the plungers 50 and 60 continue to move upwardly together until the blank 1 with the side panels positioned as shown in Fig. 11 reaches the level shown in Fig. 2 where the movement is stopped; it being understood that the movement of the plunger 50 is controlled by a suitable cam 77, and the movement of the plunger 60 by a cam 78, and that these movements are positively synchronized with the movements of the other mechanism by the means shown in Fig. 6. With the blank in the position shown in Fig. 2, the portions 6 of the side panels of the receptacle and the portions 13 of the side panels of the cover are now deflected slightly inwardly toward each other, as shown in Fig. 12, by tuckers 79 and 80, respectively. The tuckers 79 and 80 are mounted on the oppositely disposed push rods 81 and 82 which are actuated by cams 83 on the cam wheels 84 shown in Fig. 6.

Surrounding the plunger 50 but movable up and down independently thereof is the forming block 85 which is carried at the upper end of the vertically reciprocating member 86, the movements of which are controlled by cams 87. This block moves upwardly to engage the portions 6 and 13 of the side panels which have been slightly deflected by the tuckers 79 and 80 and complete the folding of these portions 6 and 13 over upon the portions 7 and 14, respectively, of the blank, with the tabs between said portions; the inner sides of the forming block which engage the portions 6 and 13 of the blank being beveled as shown at 88 in Fig. 12. It will be noted that the forming block is provided with slots 89 to permit it to pass by the fingers of the tuckers 79 and with slots 90 to permit it to pass the fingers on the tuckers 80 (see Figs. 2 and 12). Also, the block is formed in two parts or divided by a transverse slot 140 (see Fig. 2) adapted to receive the element 65 with the back panels of the cover and receptacle portions about it when the forming block moves upwardly, as described above.

When the forming block has been raised to the position shown in Fig. 3, side presser blocks 91 mounted on oppositely disposed push rods 92 and actuated by cams 93 on cam wheels 84 move simultaneously inwardly and compress the side panels of the receptacle and cover portions of the blank against the sides of the forming block to completely adhere the folded portions of the side panels firmly together with the various tabs therebetween. After the push rods 92 pass out of cooperation with the cams 93 they are retracted by means of the springs 94 (see Fig. 1).

After the side presser blocks 91 and the tuckers 79 and 80 are retracted, the plungers 50 and 60, carrying the blank between them, move upwardly and the reciprocating member 86, carrying the forming block, moves downwardly. The completely formed box is carried upwardly between the press plates at the ends of the plungers 50 and 60 past the box receiving rails 95, each of which is angularly mounted on and in relation to an arm 96 which in turn is pivotally connected to the machine at 97. The box receiving rails are normally urged in a direction toward each other by means of the springs 98 so that the normal horizontal distance between the rails 95 is less than the combined width or length of the box. As the box, in its upward movement, contacts the lower sides of the rails 95, they move outwardly away from each other due to the yielding of springs 98 and thus permit the passage of the box between them. After the passage of the box, the rails return to their normal position. At the proper time, to deposit the box on the top of the rails, the upward movement of the plunger 50 ceases but the plunger 60 continues to move until the parts associated therewith are entirely out of contact with the formed box. As the upper press plate elements 61 and 62 associated with the plunger 60 move out of contact with the formed box, the springs 56 and 57 pull the remote ends of the hinged elements 52 and 53 downwardly, thus moving the opposite ends of these plates upwardly about the hinge pivots, and these elements function to eject or deliver the formed box on the side rails 95, as shown in dotted outline 99 in Fig. 2. The plunger 50 and its associated parts now return to their original position.

Referring now particularly to Figs. 1, 2 and 3, spaced chains 100, moving in the direction of the arrow shown in Fig. 3 and carrying lugs 101, are mounted above and between the rails 95. The movement of these chains is positively synchronized with the movements of the other mechanism by means such as shown in Fig. 6, so that, after the completed box is delivered, as described above, on the top of the rails 95, one of the depending lugs on chain 101 will engage the side thereof and slide it along the rails until it is deposited on the conveying belt 102 moving in the direction of the arrows shown in Figs. 1 and 2, and which carries the completed box to any desired point. It is understood, of course, that, after the completed box has been moved off the rails 95, plunger 60 descends to its initial position, another blank is delivered to the forming head, and the cycle just described is repeated.

Referring to Figs. 13, 14, 15 and 16 we have here shown in a more or less diagrammatic way a modified type of forming head mechanism. In considering these drawings, it should be borne in mind that the views are taken from the opposite side of the forming head from which the views shown in Figs. 9, 10, 11 and 12 are taken. Here, 103 represents generally the throat. The plunger 104 may be substantially identical with the plunger 60 hereinbefore described, and the press plates 105 and 106, and the divider 107 the same as the corresponding parts in the foregoing description. In this modification however, the plunger 50 which carries the hinged plates is dispensed with, and the blank 1, in addition to being supported on the rails 43 (not here shown) as described above, is also supported on or positioned closely adjacent a pair of plates 108 and 109 which are hinged together at 110. These hinged plates are permanently positioned beneath the rails 43 and below the throat, and the blank is delivered beneath the throat with the score 66 positioned substantially over the hinge pivot and with the upturned tabs 18 closely adjacent or contiguous the upstanding ears 111 which are associated with plate 108. Separate forming blocks 112 and 113, slightly spaced apart to permit the hinged plates 108 and 109 to pass therebetween, are mounted at the upper ends of the vertically reciprocating plungers 114 and 115, respectively, which are actuated by separate cams (not shown). Plungers 116 and 117 carrying ejector plates 118 and 119, respectively, are mounted to reciprocate relative to the portions 112 and 113 and are also controlled by separate cams (not shown).

In operation, the plunger 104 carrying the divider 107 descends until the divider is in contact with the score 66 in the blank 1. At the same time, the plungers 116 and 117 carrying the ejector plates 118 and 119 rise until they contact the lower side of the hinged plates 108 and 109 and, moving upwardly into contact with the blank, fold the hinged plates with the portions 8, 9 and 10 of the blank therebetween to the position shown in Fig. 14. The plungers 104, 116 and 117 with the blank therebetween, as shown in Fig. 14, then move upwardly together, and the portions forming the side panels of the receptacle and cover are folded downwardly while the portions 6 and 13 of the blank are deflected inwardly by the tuckers as described above. After the portions 6 and 13 have been deflected inwardly, as described, the forming blocks 112 and 113 move upwardly, as shown in Figs. 15 and 16, and the same sequence of operations follows as has already been described. At the stop of the movement the completely formed box is delivered on the rails 95 by means of the ejector plates 118 and 119 which then move upwardly and away from the forming blocks to effect this delivery.

From the foregoing, it will be apparent that our machine is adapted to form boxes having integral cover and receptacle portions in which the cover and receptacle may be of the same or different depths, or in which the cover may be made slightly larger than the receptacle so as to fit telescopically thereover, or the cover and receptacle may be of identical size and depth so that the edges thereof merely abut each other when the box is closed.

Where the two parts are identical, either one may be considered the receptacle and the other the cover, and in such case it is usual to secure in one of the parts a separately formed tray of a depth somewhat greater than the depth of said part and over which the other part telescopes as a cover to close the box. However, it is obvious that, instead of using the integrally connected members formed on our machine as a cover and receptacle, respectively, of a "box", these members may be separated, by cutting or otherwise, and used separately as trays.

Hence, in order adequately to protect our invention it is to be understood that the term "box" as used herein, and particularly in the claims, includes two integrally connected members, irrespective of whether the same are used together as the cover and receptacle portion of a box or, after being substantially completely formed as an integral unit, are thereafter separated.

What we claim is:

1. In a machine adapted to form receptacles from flexible blanks, the combination with slightly spaced blank supports of a dividing element cooperating therewith, and means for effecting a relative movement of said supports and said element in a direction towards each other with said blank between to force the central portion only of said blank into the space between said supports and into a position susbtantially normal to the adjacent portions forming the major part of the blank.

2. In a machine adapted to form boxes from flat blanks of flexible material having cover-top and receptacle-bottom forming portions, the combination with a plunger having a stepped head, of a divider, and means for effecting relative movement of said divider and said plunger towards each other with said blank between until said divider moves past the plane of at least one of said portions; whereby to form a step in said blank.

3. In a machine adapted to form a telescopic box from a flat, flexible blank having portions adapted to form adjacent parallel panels in said box, the combination with means for supporting said blanks, of cooperating plungers for simultaneously forcing said panel-forming portions out of the plane of said blank and folding them together susbtantially in box-formed relation.

4. In a machine adapted to form a box from a flexible blank, the combination with oppositely movable, cooperating press plates adapted to hold and partially to form a blank positioned between them, of a divider element positioned between said plates and movable with and in advance of one of them for forcing the central portion only of said blank susbtantially into box-formed position before said blank is held by the cooperation of said plates.

5. In a machine adapted to form a box from a flexible blank, the combination with a rigid press plate having a dividing element extending from its acting face, of a second press plate cooperating directly with said rigid plate to hold said blank therebetween; said second press plate comprising two relatively movable plates positioned to permit said dividing element to pass between them.

6. In a machine adapted to form a box from a flexible blank, the combination with a rigid press plate having a dividing element extending from its acting face, of a second press plate cooperating directly with said rigid plate to press and hold said blank therebetween and comprising two pivotally mounted plates positioned to permit said dividing element to pass between them.

7. In a machine adapted to form boxes from flat blanks of flexible material, the combination with a blank support, of a divider, means for moving said divider towards and through the plane of initial support of a blank on said support, and means adapted to engage portions of the blank at either side of said divider during the movement thereof through said plane for limiting the upward movement of said portions.

8. In a machine adapted to form a box from a flexible blank having integral, cover-top and receptacle-bottom forming portions including portions therebetween adapted to form the back panels of said cover and receptacle, the combination with a pair of hinged elements normally disposed to each other in hinge-open relation beneath a blank to be formed, of a dividing element positioned above said blank and hinged elements, means for moving said hinged elements and said dividing element towards each other with said blank between them and means for closing said hinged elements about said dividing element with said blank between to bend said panel-forming portions into box-formed position.

9. In a machine adapted to form a box from a flexible blank, the combination with a rigid press plate having a dividing element extending from its acting face, of a second press plate cooperating with said rigid plate and comprising two plates pivotally mounted to tilt towards and away from each other and positioned to permit said dividing element to pass between them, and means normally urging said plates to tilt away from each other.

10. In a machine adapted to form a box having integral, telescoping, cover and receptacle portions of different depth, the combination with a blank support having parallel plane portions spaced from each other in step formation a distance substantially equal to the difference in depth of said cover and receptacle portions, of a press plate having portions cooperating with said plane portions, and a divider element between said portions of said press plate and projecting beyond the acting faces thereof.

11. In a machine adapted to form a box from a plane, flexible blank having integral cover and receptacle forming portions, the combination with a forming head, of a blank support therein, means for conveying blanks to said support with one of said portions in advance of the other, a dividing element extending in a direction transverse of the direction of movement of said blanks towards said support, means for moving said element towards said support and through the plane of a blank supported thereon and means for thereafter moving said support with the blank thereon through said forming head.

12. In a machine adapted to form a box from a flat, flexible blank having adjacent marginal tabs thereon, the combination with box-forming mechanism, of means for bending said adjacent tabs in opposite directions and through angles of approximately 90° from the plane of the blank, and means for folding said blank to bring said oppositely bent tabs into superposed box-formed relation.

13. In a machine adapted to form a box from a flat, flexible blank having marginal portions adapted to form the side panels of said box and other portions adapted to form a back panel of said box of double thickness at least in part and provided with adjacent marginal tabs, the combination with means for deflecting said marginal tabs in opposite directions relative to the plane of said blank, of means for folding said blank to bring said deflected tabs into superposed relation, and means for folding the side-panel forming portions of said blanks around said superposed tabs.

14. In a machine adapted to form a box from a flexible blank having integral, cover-top and receptacle-bottom forming portions including portions adapted to form side panels of said cover and said receptacle, and portions, having tabs thereon, adapted to form the back panels of said cover and receptacle, the combination, with a support for said blank of means cooperating therewith to bend the back panel-forming portions of said cover and said receptacle, respectively, with said tabs thereon in opposite directions into box-formed position and means for thereafter bending the side panel forming portions of the cover and receptacle into box-formed position and adhesively securing them to the tabs on the back panel forming portions of the cover and receptacle, respectively.

15. Those steps in the method of forming a box from a flat, flexible blank having integral cover and receptacle-forming portions and portions between said first mentioned portions adapted to form the back panels of said cover and receptacle portions, respectively, which comprise supporting said blank, and simultaneously forcing said panel-forming portions out of the plane of said blank and folding them together.

16. In a machine adapted to form a box from a plane, flexible blank having integral cover and receptacle forming portions including portions forming the front and side panels of said cover and receptacle, the combination with a forming head, of a blank support therein, means for conveying blanks to said support with one of said portions in advance of the other, a dividing element extending in a direction transverse of the direction of movement of said blanks towards said support, means for moving said element into contact with a blank on said support, and means for thereafter forcing said support with the blank thereon through said forming head to position said front and side panels in box-formed relation.

17. In a machine adapted to form a complete box from a single plane, flexible blank having integral cover and receptacle forming portions, the combination with a forming head, of means for conveying blanks to said head with one of said portions in advance of the other, means for drawing said portions of said blank towards each other by forming a fold in said blank extending transversely of the direction of movement of said blank toward said head, and means for maintaining said portions substantially parallel to each other during the operation of said first mentioned means.

18. In a machine adapted simultaneously to form two, connected, receptacles from a flexible blank having spaced portions adapted to form the bottoms of said receptacles and portions intermediate said portions provided with tabs thereon and adapted to form adjacent parallel panels of said receptacles, the combination with means for bending said tabs at an angle to said intermediate portions, of a blank support, and means cooperating therewith to fold said intermediate portions together into panel-formed relation with said tabs extending in opposite directions therefrom.

19. In a machine adapted to form a box from a flexible blank having integral portions adapted to form the cover-top and receptacle-bottom of said box and the front, back and side panels of the receptacle portion thereof; said side panels when formed being of double thickness at least in part; the combination with means for applying an adhesive to said side panel-forming portions, means for bending said blank to position said cover-top, receptacle-bottom, and back panel portions in box-formed relation, and means for thereafter bending said side panel-forming portions and securing them to said front and back panel forming portions in box-formed relation.

20. In a machine adapted to form a box from a flexible blank having integral portions adapted to form the cover-top and receptacle-bottom of said box and the front, back and side panels of the receptacle portion thereof; said side panels when formed being of double thickness at least in part and said back and front panel-forming portions having tabs thereon; the combination with means for bending said blank to position said cover-top, receptacle-bottom, and back panel portions in box-formed relation, and means for thereafter bending said side panel-forming portions around said tabs into box-formed relation.

21. In a machine adapted to form a box from a flexible blank having integral portions adapted to form the cover-top and receptacle-bottom of said box and the front, back and side panels of the receptacle portion thereof; said back and front panel-forming portions having tabs thereon, and said side panels, when formed, being of double thickness at least in part; the combination with means for bending said blank to position said cover-top, receptacle-bottom and back panel portion in box-formed relation, of means for further bending said blank to position said front panel in box-formed position, and means for folding said side, panel-forming portions around said tabs into box-formed relation therewith.

22. In a machine adapted to form a box from a flexible blank having portions adapted to form the cover-top, receptacle-bottom and the side panels of said cover and receptacle, and also portions having tabs thereon adapted to form the front and back panels of said receptacle and the front panel of said cover; the combination with means for bending said blank to position said cover-top and receptacle-bottom in box-formed relation, of means for further bending said blank to position the front panels of said cover and receptacle with the tabs thereon in box-formed relation, and means for folding the side, panel-forming portions of said cover and receptacle around the tabs on the other panels, respectively adjacent thereto, into box-formed position.

23. In a machine adapted to form a box from a flexible blank having portions adapted to form the cover-top, receptacle-bottom and the side panels of said cover and receptacle, and also portions having tabs thereon adapted to form the front and back panels of said cover and receptacle, respectively; the combination with means for bending said blank to position said cover-top and receptacle-bottom in box-formed relation, of means for further bending said blank to position the front panels of said cover and receptacle with the tabs thereon in box-formed relation, and means for folding the side, panel-forming portions of said cover and receptacle around the tabs on the other panels, respectively adjacent thereto, into box-formed position.

24. The structure set forth in claim 21 together with means for applying an adhesive to those portions of said blank adapted to form the side panels of said receptacle, and means for simultaneously compressing both of said side panels when in box-formed position.

25. The structure set forth in claim 22 together with means for applying an adhesive to those portions of said blank adapted to form the side panels of said cover and receptacle, and means for simultaneously compressing all of said side panels when in box-formed position.

26. Those steps in the method of forming a box from a flexible blank having portions adapted to form the cover-top and receptacle-bottom of said box, portions adapted to form side panels of said cover and receptacle of double thickness at least in part, and other portions, provided with tabs thereon, adapted to form the front and back panels of the receptacle, and at least the front panel of the cover, which comprise, applying glue to the side-panel forming portions of said blank, bending said blank to bring the cover-top and receptacle-bottom forming portions and the portion adapted to form the back panel of the receptacle with the tabs thereon into box-formed relation, bending the front panel-forming portions of the cover and receptacle with the tabs thereon into box-formed relation, and thereafter folding the side panel-forming portions of said blank with the adhesive thereon around said tabs and into box-formed position to secure the whole together.

27. Those steps in the method of forming a box from a flexible blank having portions adapted to form the cover-top and receptacle-bottom of said box, portions adapted to form side panels of said cover and receptacle, and other portions, provided with tabs thereon, adapted to form the front and back panels of the receptacle, and at least the front panel of the cover, which comprise, bending said blank to bring the cover-top and receptacle-bottom forming portions and the portion adapted to form the back panel of the receptacle with the tabs thereon into box-formed relation, bending the front panel-forming portions of the cover and receptacle with the tabs thereon into box-formed relation, and thereafter bending the side panel-forming portions of said blank into box-formed position and adhesively securing them to said tabs.

28. In a machine adapted to form a box from a flexible blank having portions adapted to form the cover-top and receptacle-bottom of said box and the front, back and side panels of the receptacle portion thereof; said back and front panel-forming portions having tabs thereon; the combination with means for bending said blank to position said cover-top, receptacle-bottom and back panel portion with the tabs thereon in box-formed relation, means for bending said front panel-forming portion with the tabs thereon into box-formed relation, and means for thereafter bending said side panel-forming portions into box-formed relation and adhesively securing them to said tabs.

29. In a machine adapted to form a box from a flexible blank having portions adapted to form the cover-top, receptacle-bottom and the side panels of said cover and receptacle, and also portions having tabs thereon adapted to form the front and back panels of said receptacle and the front panel of said cover; the combination with means for bending said blank to position said cover-top, receptacle-bottom, and said back panel-forming portion with the tabs thereon in box-formed relation, of means for bending said blank to position the front panels of said cover and receptacle with the tabs thereon in box-formed relation, and means for bending the side panel-forming portions of said cover and receptacle into box-formed relation and adhesively securing them to the tabs on the other panels, respectively adjacent thereto.

30. In a machine adapted to form a box from a flexible blank having portions adapted to form the cover-top, receptacle-bottom and the side panels of said cover and said receptacle, and also portions having tabs thereon adapted to form the front and back panels of said cover and receptacle, respectively; the combination with means for bending said blank to position said cover-top, receptacle-bottom, and said back panel-forming portions thereof with the tabs thereon in box-formed relation, of means for bending said blank to position the front panels of said cover and receptacle with the tabs thereon in box-formed relation, and means for bending the side panel-forming portions of said cover and receptacle into box-formed position and adhesively securing said portions to the tabs on the other panels adjacent thereto.

31. In a machine for forming a box from a flat blank having integral portions adapted to form the cover and receptacle of said box with a hinge therebetween, the combination with blank supporting means, of means for drawing the cover-forming and receptacle-forming portions of said blank towards each other and into box-formed relation by pushing intermediate portions of said blank forming the back panels of the cover and receptacle out of the general plane of the blank and folding them together, and means for thereafter folding other portions of the blank and securing the whole in box-formed relation.

BENJAMIN EVANS.
HENRY L. METZGER.